(12) United States Patent
Romca et al.

(10) Patent No.: US 6,481,798 B2
(45) Date of Patent: Nov. 19, 2002

(54) AIRCRAFT PASSENGER CHAIR

(75) Inventors: Jens Romca, Kiel (DE); Jochen Mueller, Kiel (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 09/804,546

(22) Filed: Mar. 9, 2001

(65) Prior Publication Data

US 2002/0043851 A1 Apr. 18, 2002

(30) Foreign Application Priority Data

Mar. 9, 2000 (DE) ......... 100 11 422
Oct. 24, 2000 (DE) ......... 100 52 591

(51) Int. Cl.⁷ ............... B60N 2/30; B60N 2/24
(52) U.S. Cl. ............... 297/354.1; 297/354.12; 297/362.13; 297/340
(58) Field of Search ......... 297/354.1, 354.12, 297/362.13, 340

(56) References Cited

U.S. PATENT DOCUMENTS

| | | | | |
|---|---|---|---|---|
| 3,037,812 A | * | 6/1962 | Monroe | 297/362.13 |
| 3,145,052 A | * | 8/1964 | Morgan | 297/362.13 X |
| 3,342,527 A | * | 9/1967 | Bencene | 297/354.12 X |
| 3,580,635 A | * | 5/1971 | Posh | 297/362.13 |
| 3,588,172 A | * | 6/1971 | McGregor | 297/362.13 |
| 3,744,843 A | * | 7/1973 | Barecki et al. | 297/354.12 X |
| 4,291,916 A | * | 9/1981 | Chardon | 297/354.12 X |
| 5,240,309 A | * | 8/1993 | Kojer | 297/354.1 X |
| 5,280,999 A | * | 1/1994 | Jones et al. | 297/354.12 X |
| 5,779,312 A | * | 7/1998 | Nagai et al. | 297/362.13 |

FOREIGN PATENT DOCUMENTS

| | | | | |
|---|---|---|---|---|
| CA | 557326 | * | 5/1958 | 297/362.13 |
| CA | 981173 | * | 1/1976 | 297/354.12 |
| DE | 19742773 | | 4/1999 | |
| EP | 0322930 | | 7/1989 | |
| GB | 1410661 | * | 10/1975 | 297/354.12 |
| JP | 406277126 | * | 10/1994 | 297/362.13 |

* cited by examiner

*Primary Examiner*—Rodney B. White
(74) *Attorney, Agent, or Firm*—W. F. Fasse; W. G. Fasse

(57) ABSTRACT

An aircraft passenger chair has a support frame, a seat and a backrest. A position adjustment mechanism is coupled between the frame and the backrest by a unidirectional force transmission to permit tilting the backrest clockwise forward into a parking position while simultaneously shifting the seat backward independently of the position adjustment mechanism to increase the space between two rows of seats. Operating the position adjustment mechanism tilts the backrest counterclockwise from an upright position into a rest position and returns the backrest into its upright position. Bringing the backrest into the parking position and shifting the seat simultaneously backward is independent of tilting the backrest into a rest position. Similarly returning the backrest and the seat into the respective normal position is also independent of returning the backrest from the rest position into the normal position.

9 Claims, 4 Drawing Sheets

AIRCRAFT PASSENGER CHAIR

FIELD OF THE INVENTION

The invention relates to aircraft passenger chairs arranged in rows and columns in a passenger aircraft cabin. Such chairs are normally equipped with a support frame, a seat, and a backrest supported by the support frame. Conventionally, an adjustment mechanism permits adjusting the backrest from an upright position to a back leaning rest position.

BACKGROUND INFORMATION

Increasing the comfort for the passenger is an ever-present goal for aircraft manufacturers. For example, adjusting an aircraft passenger seat from a normal sitting position into a bed position is disclosed in German Patent Publication DE 197 42 773 A1. Further, it is known from European Patent Publication EP 322 930 A2 to increase the width of a passenger seat crosswise to the forward direction for increasing a passenger's comfort.

Another concern in the construction of passenger seats is the desire for a rapid boarding and deplaning or deboarding of the passenger aircraft to reduce the ground time also referred to as turn-around time which has an influence on the profitability of the operation of the aircraft.

Currently there exists a time consuming problem because during boarding and deboarding passengers block the aisles by trying to place their carry-on luggage into overhead luggage bins or removing such luggage from the bins. By standing in the aisles while handling their carry-on luggage passengers prevent other passengers from proceeding to their assigned seats or rather chairs having seats whereby the loading or unloading procedure suffers substantial delays. While each passenger may not need too much time, the sum total of the time wasted in this manner is substantial and has a negative influence on the ground time of a passenger aircraft. The ground or turn-around time must be reduced to increase an aircraft's profitability.

Objects of the Invention

In view of the above it is the aim of the invention to achieve the following objects singly or in combination:

- to construct an aircraft passenger chair or groups of chairs in such a manner that a passenger rather than standing in the aisle for access to a luggage bin, can stand in the space between two rows of seats to thereby permit other passengers to pass by;
- to facilitate the cleaning operation by providing better access to a row of chairs; and
- to control, preferably centrally from the cockpit, the forward, tilting operation of a backrest so that the backrest can be placed into a forward position during boarding, deboarding and cleaning, but preferably prevented or subject to a special control during flight, while a backward or counterclockwise tilting shall be possible at all times.

SUMMARY OF THE INVENTION

The above objects have been achieved according to the invention in that an aircraft passenger chair equipped with a support frame, a slidable seat and a backrest mounted to the support frame comprises a position adjustment mechanism coupled to the support frame and to the backrest for turning or tilting the backrest in the counterclockwise direction. Additionally, a coupling lever connects the backrest to the slidable seat so that the seat is moved back when the backrest is manually tilted from a normal upright position into a forwardly inclined position above the respective seat to provide more space in front of a next seat in a column of seats. A backrest according to the invention is capable of taking up three basic positions, namely a fully forward inclined position independently of the adjustment mechanism, an upright position, and a fully backwardly inclined position and possibly positions inbetween. The clockwise positioning is independent of the adjustment mechanism which performs only the counterclockwise adjustment.

In an emergency the backrest can be tilted forward even more so that the back surfaces of the backrests can be used by passengers to move to exits.

Incidentally, the terms "forward" and "backward" as used herein have reference to the longitudinal axis of the aircraft and the flight direction.

It is a special advantage of the invention that the comfort of the passengers has been combined with an increased profitability of the aircraft. More specifically, a passenger can adjust the backrest to his desires and additionally during boarding or deplaning can handle the carry-on luggage by standing between two rows of seats without blocking an aisle to the discomfort of other passengers. Boarding and deplaning is sped up because passengers do not need to wait in the aisles. By bringing the backrest into a forward or so-called parking position while the aircraft is on the ground, the available space between seat rows is increased so that a passenger can stand between two seat rows temporarily to have access to the luggage bin. Thus, the aisles need no longer be blocked by passengers handling their carry-on luggage. These features substantially reduce the ground time of the aircraft, thereby reducing the so-called turn around time which contributes to the profitability of the operation of the aircraft.

BRIEF DESCRIPTION OF THE DRAWINGS

In order that the invention may be clearly understood, it will now be described in connection with an example embodiment, with reference to the accompanying drawings, wherein.

DETAILED DESCRIPTION OF PREFERRED EXAMPLE EMBODIMENTS AND OF THE BEST MODE OF THE INVENTION

While it is customary to refer to passenger chairs as "seats", a distinction is made in this specification between the "chair" with all its components and the "seat" which is one of these components.

Figure 1:
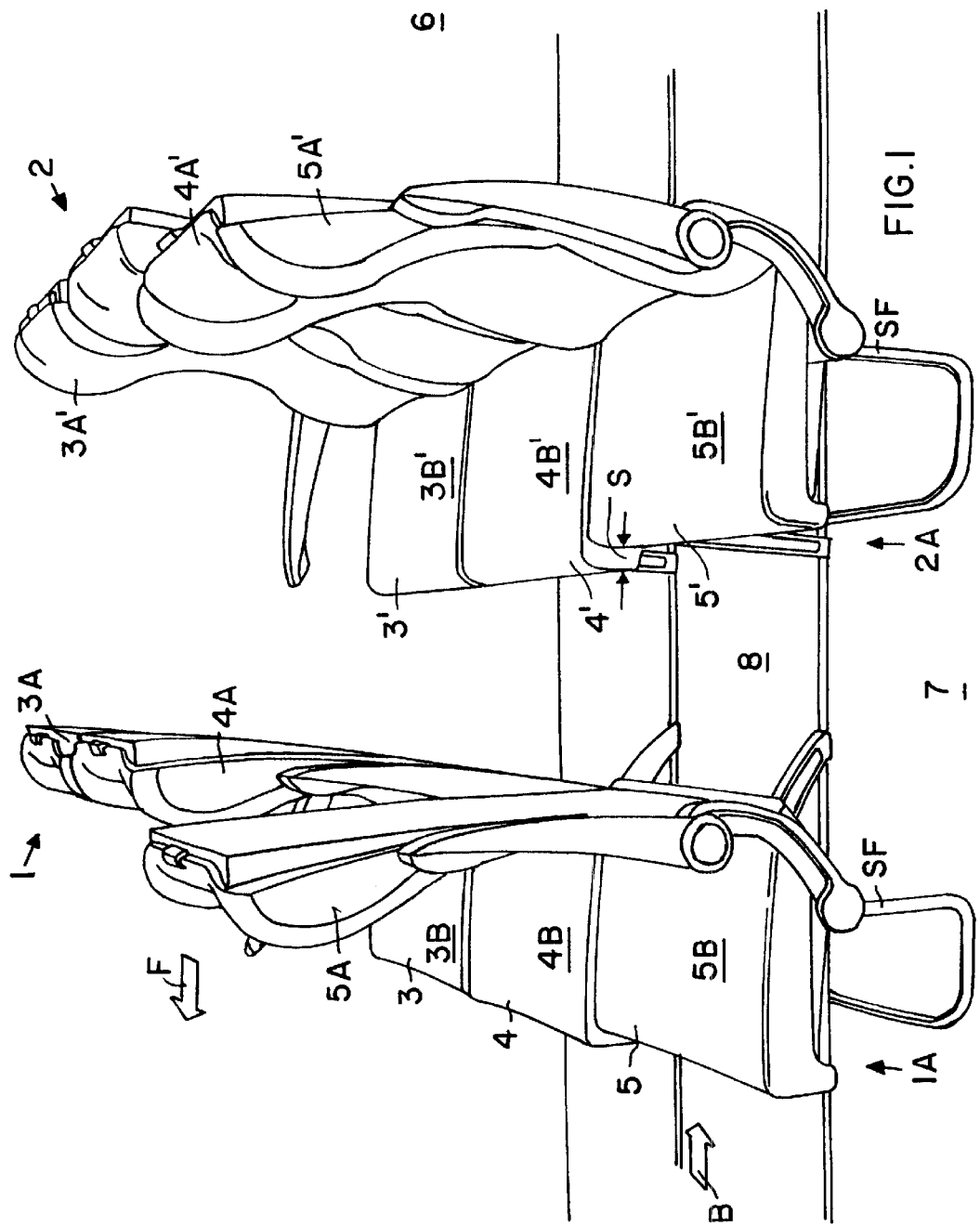
FIG. 1 shows a perspective view of two rows of aircraft passenger chairs arranged one behind the other to form chair columns in the longitudinal direction of the aircraft.

FIG. 1 shows a first group 1 of passenger chairs 3, 4 and 5 forming a first row 1A. A second group 2 of passenger chairs 3', 4', 5' forms a second row 2A. Each row 1A, 2A is provided with its seat support frame SF. All seats face in the forward direction indicated by an arrow F. The backward direction is indicated by an arrow B. The chairs are arranged in columns extending in parallel to an aisle 7 and in parallel to the longitudinal aircraft direction F in a passenger aircraft cabin 6. Each chair 3, 4, 5 and 3', 4', 5' respectively comprises a backrest 3A, 4A, 5A and a seat 3B, 4B, 5B in the row 1A and a back rest 3A', 4A', 5A' and a seat 3B', 4B', 5B' in the row 2A.

As a passenger walks along the aisle 7, during boarding or deboarding, to his or her assigned seat or chair the passenger can step into the space 8 between the two rows of chairs because the space 8 is temporarily increased by a spacing S either manually by a passenger or by a central control while the aircraft parks on the ground, as will be described in more detail below. The access openings of luggage compartments (not shown) above the seats are so positioned that a passenger standing in the space 8 on the cabin floor can place luggage into the compartment or take out luggage from the compartment while leaving the aisle 7 free for other passengers to move on. Thus, a more efficient boarding and deboarding by the passengers is possible.

In conventional arrangements of rows of passenger chairs the space 8 between two rows is not sufficient for a passenger to stand upright in that space while moving luggage into or out of a luggage compartment. The invention solves this problem. At least each chair 5, 5' alongside the aisle 7 is equipped with a forward leanable backrest 5A and 5A' as will be described in more detail below. Additional chairs in a row may also be equipped with such backrests capable to be leaned forward.

Figure 2:
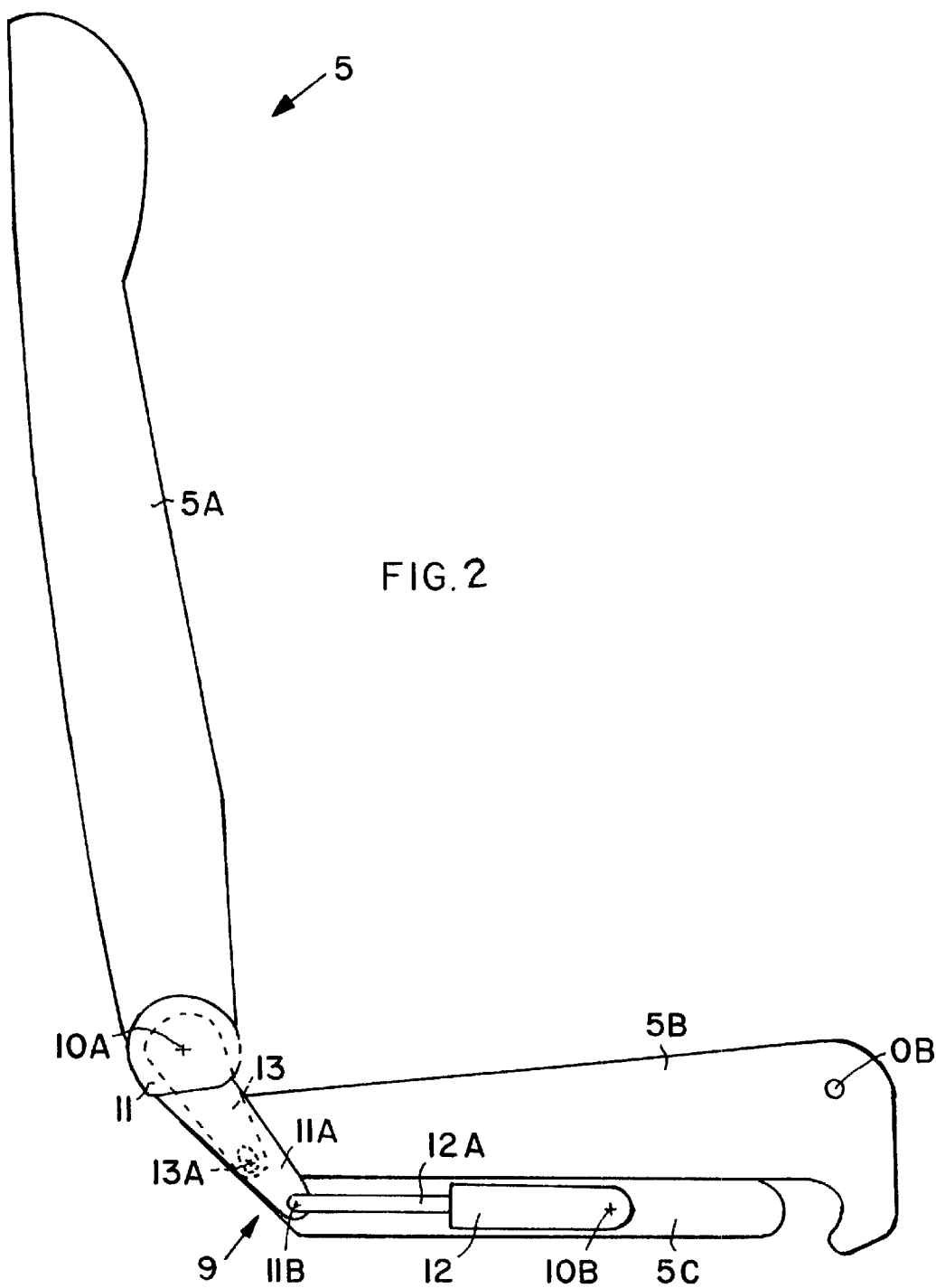
FIG. 2 is a side view of an aircraft passenger chair according to the invention showing the present backrest position adjustment mechanism and the backrest in its normal upright position.

FIG. 2 shows the normal upright position of a backrest 5A. A position adjustment mechanism 9 according to the invention connects the backrest 5A to a seat support section 5C that is part of the support frame SF. The backrest 5A is brought out of this normal upright position into a backward rest position by tilting the backrest 5A backwardly in the direction of the arrow B. The backward rest position is shown in FIG. 4. The tilting of the backrest operates the position adjustment mechanism 9 shown in FIGS. 2, 3 and 4 as will be described in more detail below. The backrest 5A is brought out of the upright, normal position shown in FIG. 3 by tilting the backrest 5A forwardly as shown in FIG. 3.

First the backward tilting of the backrest 5A into the rest position and the forward tilting of the backrest 5A into the normal position will be described. The above mentioned position adjustment mechanism 9 comprises a force transmission 11 such as a clutch or ratchet or the like connecting a hinge or journal axis 10A of the backrest 5A through a lever link 11A to a gas spring 12. The lever link 11A and the gas spring 12 are effective only for the adjustment of the backrest 5A from the normal position of FIG. 2 into rest position of FIG. 4 and vice versa. The rest position is reached by manually pushing the backrest in the direction of the arrow B against the spring force of the gas spring 12. The gas spring 12 assists in returning the backrest into the upright position of FIG. 2. This movement of the backrest 5A between the positions of FIGS. 2 and 4 does not affect the position of the seat 5B. For the just described operation a piston rod 12A of the gas spring 12 is journaled to the lever link 11A by a journal or pivot 11B. One end of the gas spring 12 is journaled by a journal 10B to the seat support section 5C. The force transmission 11 can be any machine element that permits a rotation of the backrest 5A in the direction of the arrow W into the forward position of FIG 3 independently of the lever link 11A. The force transmission 11 also allows the backrest 5A to be moved in the direction of the arrow B with the help of the gas spring 12. Such operation can be performed by operating a button OB for moving the piston rod 12A to the right in FIG. 2 thereby bringing the backrest 5A from the position of FIG. 2 to the position of FIG 4 or vice versa. A one directional clutch function could, for example, be performed by a ratchet or similar conventional machine element.

The tilting of the backrest 5A according to the invention in the forward direction shown by the arrow F from the normal position of FIG. 2 into the forward position of FIG. 3 and back again in the direction of the arrow B will now be described. This operation can be performed manually by a passenger or, preferably, with a power drive in a response to a control by a crew member. The force transmission 11 is connected to the hinge axis 10A as a fixed axis for tilting the backrest 5A. A coupling lever 13 is rigidly connected to the backrest 5A and coupled by an elongated hole 13A to a rear end of the seat 5B. A manual clockwise rotation of the backrest 5A as indicated by the tilting arrow W in FIG. 3 into the forwardly inclined position of FIG. 3 is transmitted to the seat 5B by the coupling lever 13 because a journal pin 13B fixed to the seat 5B fits into the elongated hole 13A of the coupling lever 13. The coupling lever 13 moves the seat 5B with the aid of the journal pin 13B until forward tilting of the backrest 5A reaches the forward position 5A1 shown in FIG. 3. This motion of the seat 5B is a linear motion. In this position a downwardly reaching extension E of the seat 5B bears against a stop 14 formed by a forward end of the support section 5C. The support section 5C guides the linear seat motion. If it should become necessary in an emergency to further tilt the backrest 5A in the forward direction more than indicated by the tilting arrow W in FIG. 3 to permit passengers to move along the back sides of the backrest to reach emergency exits more quickly, an override connection between the seat 5B and the coupling lever 13, e.g. a spring will permit such movement without further moving the seat 5B backward in the direction of the arrow B. The angle indicated by the arrow W is normally within the range of 20 to 30° relative to the upright normal position of the backrest 5A shown in FIG. 2. However, once the force of the override spring is exceeded, the backrest 5A can be manually tilted into an emergency position until the backrest 5A contacts the seat 5B. The emergency position is not shown.

Figure 3:
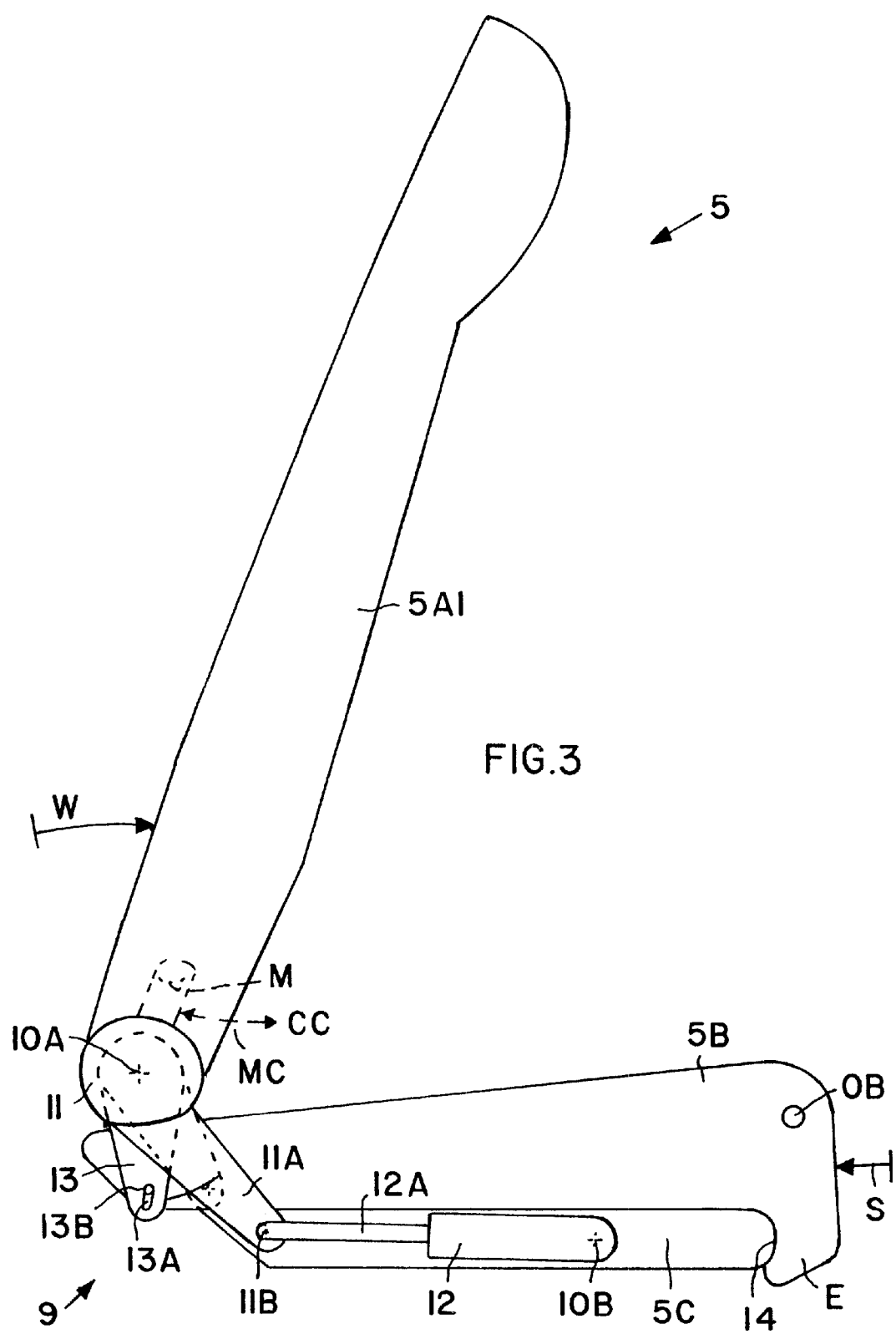
FIG. 3 is a view similar to that of FIG. 2, however showing the backrest in a forwardly inclined position, the so-called parking position when the aircraft is on the ground.
Figure 4:
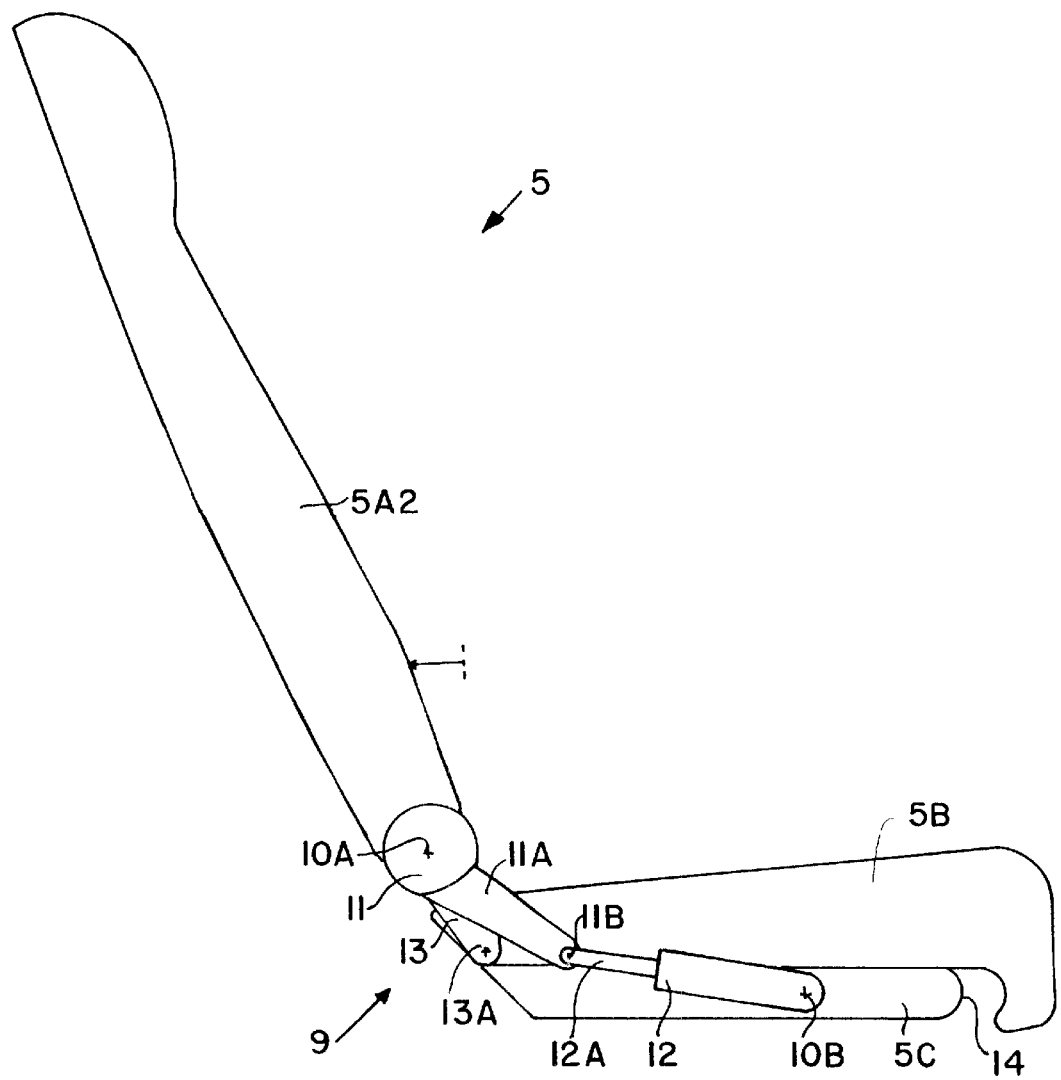
FIG. 4 is a side view similar to that of FIGS. 2 and 3, however showing the backrest in a backwardly inclined rest position.

When the seat 5B is in the backward position shown in FIG. 3, the spacing S, also shown in FIG. 1, is gained to increase the standing room 8 between two rows of chairs.

This increased standing room is particularly useful when the aircraft is parked on the ground for cleaning, boarding and deboarding operations. Therefore, rather than leaving it to passengers to tilt the backrest forward into the position of FIG. 3, it is an option or alternative solution to perform the tilting in the forward direction of the arrow W with a power drive motor M which is electrically connected by a motor energy supply and control conductors MC to a central control CC of the aircraft for operation by a crew member. One motor M is connected to each backrest at least along the aisle 7. However, the mechanical connection between the motor M and the respective backrest is such that a manual tilting of the backrest to and from the position of FIG. 3 is possible at all times even though a positive forward drive by the motor M to the backrest for tilting from the position of FIG. 2. into the position of FIG. 3 is available, if desired. In any event the manual tilting to and from the position of FIG. 3 is available even without the motor M. Returning any backrest from the position of FIG. 3 to the position of FIG. 2 is preferably left to be done manually by each passenger. The motor M and its connection to the backrest permit such manual counterclockwise return of the backrest into the position of FIG. 2.

Any further tilting from the position of FIG. 2 into the position of FIG. 4 and back again into the position shown in FIG. 2 takes place as described above with the help of the gas spring 12 as described above and independently of any forward tilting also as described above.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An aircraft passenger chair comprising a support frame, a seat and a backrest mounted on said support frame, a backrest hinge (10A) for permitting turning of said backrest in a forward direction (F) and in a backward direction (B), a position adjustment mechanism (9) supported by said support frame and connected to said backrest for turning of said backrest from a normal upright position into a backward rest position and back again into said normal upright position, said position adjustment mechanism comprising means (13, 13A, 13B) for forward tilting of said backrest from said normal upright position into a forward parking position and back again into said normal upright position independently of said turning of said backrest, and wherein said means for forward (F) tilting of said backrest comprise a coupling operatively connected between said backrest and said seat so that said seat is shifted linearly backward (B) when said backrest is tilted forward and vice versa independently of said position adjustment mechanism (9).

2. The aircraft passenger chair of claim 1, wherein said coupling comprises a coupling lever (13) between said backrest and said seat for shifting said seat (5B) forward (F) when said backrest is tilted backward (B) from said forward (F) parking position back into said normal upright position.

3. The aircraft passenger chair of claim 1, wherein said support frame comprises a stop (14) for limiting a linear backward (B) movement of said seat.

4. The aircraft passenger seat of claim 1, further comprising a unidirectional force transmission (11) between said backrest and said position adjustment mechanism, said unidirectional force transmission permitting tilting of said backrest into a forward position independently of said position adjustment mechanism (9) and for permitting manual tilting of said backrest backward (B) into an upright normal position.

5. The aircraft passenger chair of claim 1, wherein said means for forward tilting of said backrest comprise a power drive motor (M) operatively connected to said backrest and to said seat for tilting said backrest forward and simultaneously shifting said seat backward for increasing a space (8) between rows of seats.

6. The aircraft passenger chair of claim 5, further comprising power supply and control conductors connecting said power drive motor (M) to a central aircraft control for centrally controlling a movement of said backrest into said parking position.

7. The aircraft passenger chair of claim 5, wherein said power drive motor permits a manual tilting of said backrest from said parking position into said upright normal position and simultaneously linearly shifting said seat forward.

8. An aircraft passenger cabin comprising a plurality of passenger chairs arranged in rows and columns, in each row at least one passenger chair comprising a support frame, a seat and a backrest, a hinge mounting said backrest to said support frame, said hinge (10A) permitting turning of said backrest in a forward direction (F) and in a backward direction (B), a position adjustment mechanism (9) supported by said support frame and connected to said backrest for turning of said backrest from a normal upright position into a backward rest position and back again into said normal upright position, said position adjustment mechanism comprising means (13, 13A, 13B) for tilting of said backrest from said normal upright position into a forward position and back again into said normal upright position independently of said turning of said backrest, said means for forward (F) tilting of said backrest comprising a coupling operatively connected between said backrest and said seat so that said seat is shifted linearly backward (B) when said backrest is tilted forward and vice versa independently of said position adjustment mechanism (9).

9. The aircraft passenger cabin of claim 8, wherein said at least one passenger chair is positioned next to an aisle (7) in said passenger cabin.

* * * * *